United States Patent
Tanitomi

[11] Patent Number: 5,829,188
[45] Date of Patent: *Nov. 3, 1998

[54] EXTERMINATION DEVICE AND VAPORIZATION UNIT FOR EXTERMINATION LIQUID

[75] Inventor: Fuminao Tanitomi, Kumamoto, Japan

[73] Assignee: Yuugen Kaisha Kaishin, Japan

[*] Notice: This patent issued on a continued prosecution application filed under 37 CFR 1.53(d), and is subject to the twenty year patent term provisions of 35 U.S.C. 154(a)(2).

[21] Appl. No.: 561,459

[22] Filed: Nov. 21, 1995

[30] Foreign Application Priority Data

Dec. 2, 1994 [JP] Japan .................................. 6-329488

[51] Int. Cl.$^6$ .................................................. A01M 13/00
[52] U.S. Cl. ................................ 43/129; 261/30; 261/24; 43/125
[58] Field of Search ............................. 43/129, 125, 124, 43/107, 112, 113; 239/45, 46; 422/122, 124; 261/30, 24

[56] References Cited

U.S. PATENT DOCUMENTS

| | | | |
|---|---|---|---|
| 3,633,881 | 1/1972 | Yurdin | 239/44 |
| 4,173,604 | 11/1979 | Dimacopoulos | 236/45 |
| 4,383,951 | 5/1983 | Palson | 239/46 |
| 4,699,737 | 10/1987 | Engstrand | 261/24 |
| 4,860,488 | 8/1989 | Shigetoyo | 43/129 |
| 5,133,904 | 7/1992 | Pepper | 261/24 |
| 5,250,232 | 10/1993 | Pepper et al. | 261/24 |
| 5,335,446 | 8/1994 | Shigetoyo | 43/129 |
| 5,529,726 | 6/1996 | Glenn | 261/142 |

Primary Examiner—Michael J. Carone
Assistant Examiner—Fredrick T. French, III
Attorney, Agent, or Firm—Morrison Law Firm

[57] ABSTRACT

A liquid storage container, in which an extermination liquid is stored, is at an upper portion of a case. A gauze or other permeable material is mounted on the outer surface of a support on a lower portion of the liquid storage container. An upper end of a portion of the gauze is transferably connected to the liquid storage container to transfer extermination liquid to the rest of the gauze by wicking action. Capillary action causes the extermination liquid to saturate the gauze. A sirocco fan and a motor, below the gauze, causes air from outside to be drawn into the case from an opening on the upper portion of case. The air passes through and around the gauze, causing vaporization of the extermination liquid in the gauze. The vaporized extermination liquid, cooled and densified by vaporization, is blown outside the case through a lower ventilation opening of the case.

14 Claims, 4 Drawing Sheets

EXTERMINATION DEVICE AND VAPORIZATION UNIT FOR EXTERMINATION LIQUID

BACKGROUND OF THE INVENTION

The present invention relates to an extermination device and a vaporizing unit for extermination liquid for installation in facilities where produce is grown and in facilities where produce is used.

Produce such as strawberries, melons, cucumbers and tomatoes are often grown in greenhouses. Greenhouses are, by design, structures that use solar radiation to heat the entrained air inside the greenhouse enclosures. In addition, greenhouses often burn oil or gas for supplemental heating. Thus, greenhouses create warm, moist environments with good lighting which are conducive to the growth of plants. Such environmental conditions, however, are simultaneously very detrimentally conducive to the growth of various kinds of noxious animals such as insects, spiders, mites, and small rodents. Extermination liquids such as agricultural pesticides are often sprayed inside greenhouses to suppress the proliferation of such pests.

Furthermore, unwanted plants such as weeds, fungi, or blights often find the greenhouse conditions very suitable for propagation. Extermination liquids such as herbicides and fungicides are often sprayed inside greenhouses to suppress the proliferation of such unwanted vegetation.

Similarly, noxious animals such as cockroaches, mites, and small rodents frequently inhabit facilities such as restaurants, food processing plants and hospitals. Such facilities have environments with an abundance of food that, when combined with the agreeable heat, humidity, and lighting conditions maintained in such facilities, are conducive to the growth and spread of such noxious animals. Extermination liquids such as institutional pesticides are often sprayed inside such facilities to suppress the proliferation of such pests.

Furthermore, such facilities as restaurants, food processing plants and hospitals need to minimize the growth of microbes such as bacteria, protozoa and viruses. Extermination liquids such as institutional antiseptics are often sprayed inside such facilities to suppress the proliferation of such pests.

However, there are many problems associated with the spraying of extermination liquids. Extermination liquid spraying is very labor intensive because such spraying must be done manually by a worker. Such spraying must be performed carefully and knowledgeably. Overspraying must be avoided to minimize material costs and hazardous health exposures. On the other hand, underspraying must be avoided to maximize efficiency and to avoid having pests develop chemical tolerance to the applied chemicals. Thus, extermination liquid spraying demands a certain level of skill that requires, at a minimum, hiring semi-skilled workers. Consequently, significant labor cost is required for extermination liquid spraying.

Further, extermination liquid spraying must be carefully controlled and scheduled to minimize disruptions in the workplace. Certain activities such as produce packing, food preparation, and critical patient care are incompatible with the application of extermination liquids because contaminating foodstuffs and seriously ill patients is intolerable. As a result, extermination liquid spraying involves significant inconvenience and expense.

Another consideration is the need for applying extermination liquids continuously to control noxious flora and fauna that are extremely dangerous and virulent and the need for applying frequently to control noxious flora and fauna that reproduce rapidly after intervals of dormancy during which extermination liquids are ineffective.

In addition, a health hazard exists because the extermination liquids might be inhaled and ingested by the worker who is spraying the extermination liquid and by other persons in the sprayed area.

Furthermore, conventional means are not completely effective for eliminating vermin, such as cockroaches, in facilities such as restaurants, food processing plants, and hospitals. Thus, such vermin often are found in these places and contribute to an unsanitary environment.

OBJECTS AND SUMMARY OF THE INVENTION

In view of the above problems, an object of the present invention is to overcome the problems of conventional spraying of extermination liquids.

Another object of the present invention is to provide a device for automatically and effectively spraying an extermination liquid.

Another object of the present invention is to provide a device for automatically and effectively spraying an extermination liquid at a low height near the ground.

Another object of the present invention is to provide a device for automatically and effectively spraying an extermination liquid at a high height away from the ground.

Briefly stated, an embodiment of the present invention provides a liquid storage container, in which an extermination liquid is stored, is at an upper portion of a case. A gauze or other permeable material is mounted on the outer surface of a support on a lower portion of the liquid storage container. An upper end of a portion of the gauze is transferably connected to the liquid storage container to transfer extermination liquid to the rest of the gauze by wicking action. Capillary action causes the extermination liquid to saturate the gauze. A sirocco fan and a motor, below the gauze, causes air from outside to be drawn into the case from an opening on the upper portion of case. The air passes through and around the gauze, causing vaporization of the extermination liquid in the gauze. The vaporized extermination liquid, cooled and densified by vaporization, is blown outside the case through a lower ventilation opening of the case According to an embodiment of the invention, an extermination device includes a means for storing an extermination liquid in a case, a permeable saturating body removably connected to the case, means for wetting the permeable saturating body with the extermination liquid from the means for storing an extermination liquid, and means for vaporizing the extermination liquid from the permeable saturating body by forcing air through the wetted permeable saturating body.

According to another embodiment of the invention, an extermination device includes a means for storing an extermination liquid in a case, a permeable saturating body removably connected to the case, means for wetting the permeable saturating body with the extermination liquid from the means for storing the extermination liquid, and means for vaporizing the extermination liquid from the permeable saturating body by forcing air around the wetted permeable saturating body.

According to another embodiment of the present invention, an extermination device includes a means for storing an extermination liquid in a case, a permeable saturating body removably connected to the case, means for wetting by capillary action the permeable saturating body with the extermination liquid from the means for storing an extermination liquid, and means for vaporizing the extermination liquid from the permeable saturating body by a plurality of fans forcing air through the wetted permeable saturating body.

According to still another embodiment of the present invention, an extermination device includes a liquid storage container for storing an extermination liquid, the liquid storage container being mounted in a case, a permeable saturating body in the case below the liquid storage container, the permeable saturating body being wetted with the extermination liquid from the liquid storage container by capillary action, a first plurality of openings in the case, a second plurality of openings on the case, means for drawing air into the case through the first plurality of openings in the case and blowing air out of the case through the second plurality of openings in the case, the means for drawing air forcing the drawn air through the permeable saturating body, thereby vaporizing the extermination liquid wetted therein, and emitting of the vaporized extermination liquid through the second plurality of openings in the case.

According to yet another embodiment of the present invention, an extermination device includes a liquid storage container for storing an extermination liquid, the liquid storage container being mounted in a case, an upper housing portion of the case being removably connected to a middle portion of the case, the middle portion being removably connected to a lower base portion of the case, a first permeable saturating body mounted below the liquid storage container, the first permeable saturating body being wetted with the extermination liquid from the liquid storage container by capillary action, a first permeable support being under the liquid storage container supports the first permeable saturating body, a first vaporizing unit formed from the liquid storage container, the first permeable support, and the first permeable saturating body, the first vaporizing unit replaceably stored within the upper portion, a second permeable saturating body, a second permeable support supporting the second permeable saturating body under the first vaporizing unit, a second vaporizing unit formed from the second permeable saturating body and the second permeable support, the second vaporizing unit replaceably stored within the middle portion; a first plurality of openings in the case, a second plurality of openings in the case, a plurality of fans being mounted in the case, the plurality of fans draw air into the case through the first plurality of openings on the case and blow air out of the case through the second plurality of openings on the case, the plurality of fans force the drawn air through and around the first permeable saturating body and second permeable saturating body, causing vaporization of the extermination liquid wetted therein, and causing emission of the vaporized extermination liquid through the second plurality of openings on the case, a plurality of motors rotating the plurality of fans, and the plurality of motors being mounted in the lower base portion.

According to another embodiment of the present invention, a vaporizing unit for extermination devices includes a means for storing an extermination liquid, a permeable saturating body, means for transferably connecting the permeable saturating body to the means for storing, and means for wetting the permeable saturating body with the extermination liquid.

According to still another embodiment of the present invention, a vaporizing unit for extermination devices includes a means for storing an extermination liquid, a permeable saturating body removably connected at a lower end of the means for storing, and means for wetting the permeable saturating body being wetted with the extermination liquid via capillary action.

The above, and other objects, features and advantages of the present invention will become apparent from the following description read in conjunction with the accompanying drawings, in which like reference numerals designate the same elements.

DETAILED DESCRIPTION OF PREFERRED EMBODIMENT

Figure 1:
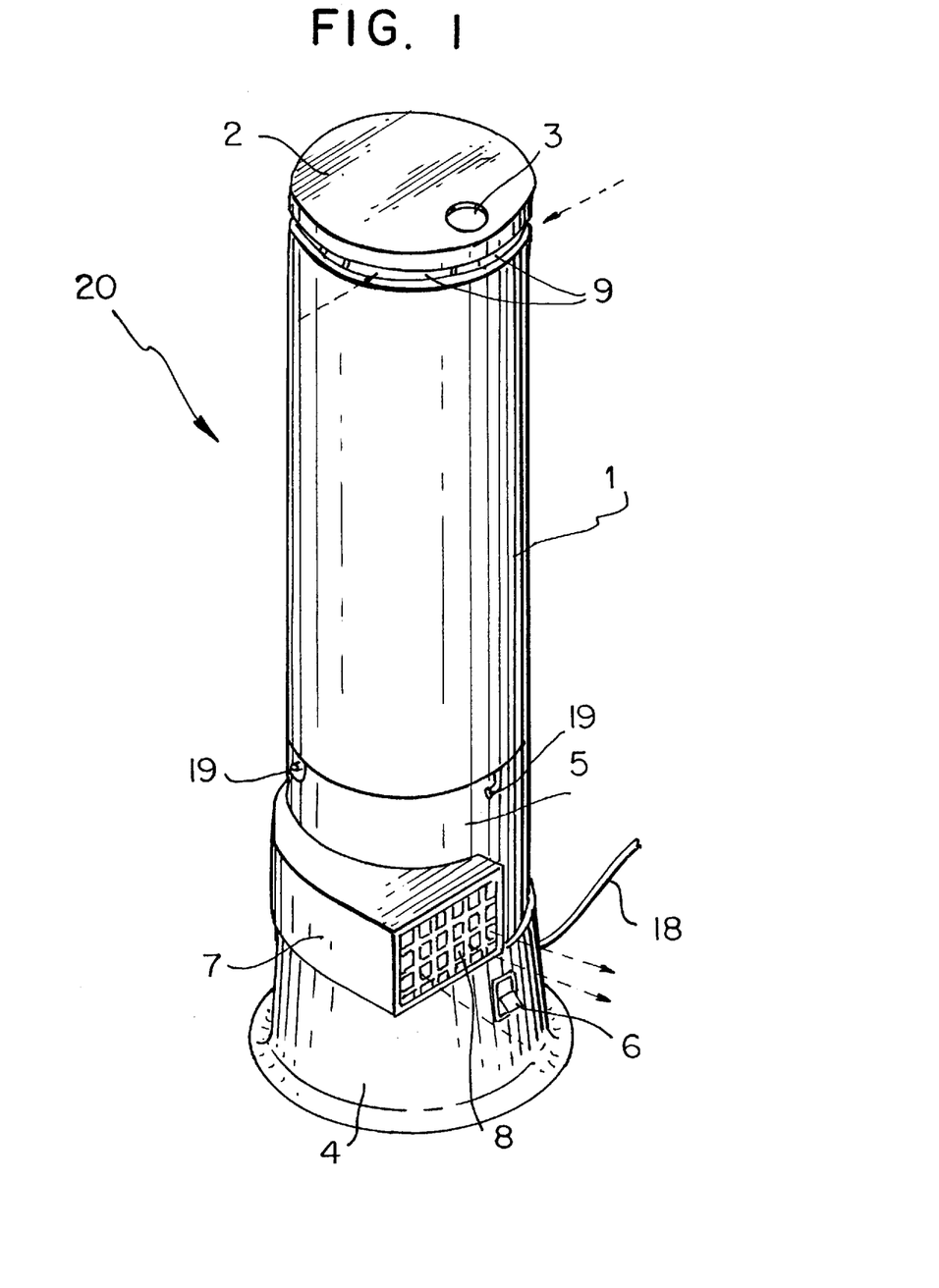
FIG. 1 is a perspective view of an extermination device according to an embodiment of the present invention.

Referring to FIG. 1, an extermination device, generally shown at 20, includes a case 1. A cap 2 is removably mounted on an upper surface of case 1 to allow access to an interior of case 1. An intake hole 3 in cap 2 allows extermination liquid to be poured into extermination device 20. A middle case section 5 is mounted on a base 4.

Case 1 is removably mounted on middle case section 5 to allow access to an interior of middle case section 5. A stopping piece 19 detachably engages case 1 and middle case section 5.

A power switch 6 on an outer surface of base 4 controls electrical power supplied by a power cord 18 to extermination device 20. A hood 7 on an outer surface of middle case section 5 allows air to enter or exit from extermination device 20 through a ventilation opening 8 on a front surface of hood 7. A slit-shaped opening 9 between case 1 and cap 2 similarly allows air to enter or exit from extermination device 20.

Figure 2:
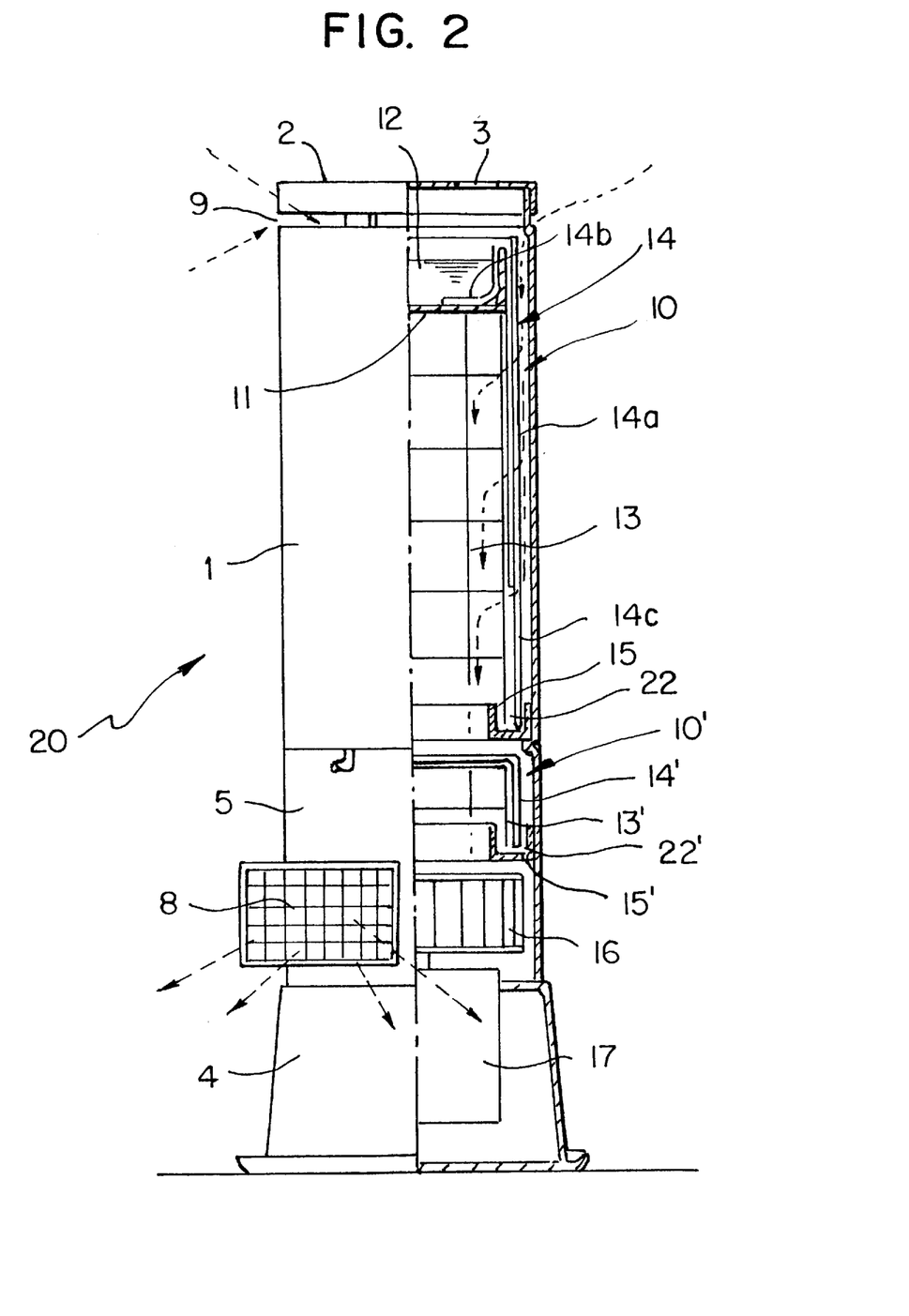
FIG. 2 is a partial cross-sectional view of an extermination device according to an embodiment of the present invention.

Referring to FIG. 2, an internal configuration of extermination device 20 includes a vaporizing unit 10 contained within case 1. An extermination liquid 12 is held in a liquid storage container 11 when poured through intake hole 3.

A support 13 made of a permeable lattice material firmly supports liquid storage container 11 at substantially a top of case 1. Liquid storage container 11 and support 13 are wrapped by a permeable material such as a gauze 14 which provides a high surface area for vaporization of extermination liquid 12 when gauze 14 is wetted by extermination liquid 12.

Gauze 14 includes three sections: a tongue portion 14b, a thick portion 14a, and a thin portion 14c. Tongue portion 14b is transferably connected to liquid storage container 11 to allow transfer of extermination liquid 12 from liquid storage container 11 to thick portion 14a by capillary action. Thick portion 14a transfers extermination liquid 12 to thin portion 14c and serves as another source for vaporization of extermination liquid 12. Thin portion 14c provides high surface area and permeability to facilitate intermingling of air and extermination liquid 12 advantageously to vaporize extermination liquid 12.

Support 13 rests on a channelled container 15 which allows collection of excess extermination liquid 12 from gauze 14. Channelled container 15 is ring shaped for a cylindrical configuration of the extermination device 20 shown in FIG. 2. A lower end of thin portion 14c is within a channel 22 of channelled container 15 to control spillage of excess extermination liquid 12.

Case 1 is removably mounted on middle case section 5 to allow access to vaporizing unit 10 and access to a second vaporizing unit 10' held within middle case section 5. Second vaporizing unit 10' is configured similarly to vaporizing unit 10. A permeable lattice material, such as a support 13', vertically supports a gauze 14' which is wrapped and mounted on an outer surface of support 13'.

Gauze 14' is wetted with overflow extermination liquid 12 from channelled container 15. Gauze 14' provides a further vaporizing source for extermination liquid 12 vapor. Support 13' and gauze 14' are mounted on a channelled container 15' to collect excess extermination liquid 12 from gauze 14'. A lower end of gauze 14' is within a channel 22' of channelled container 15' to control spillage of excess extermination liquid 12 from gauze 14'.

Second vaporizing unit 10' is mounted above a ventilating unit such as a sirocco fan 16. A motor 17 mounted in base 4 drives sirocco fan 16 either to pull air in from opening 9 and out at ventilation opening 8 or to pull air in from ventilation opening 8 and out at opening 9, depending on the driven rotational direction of sirocco fan 16.

A power cord 18 supplies electrical power controlled by a power switch 6 to motor 17. When switch 6 is turned on, motor 17 rotates, and air from outside is pulled into case 1 via opening 9.

Figure 3:
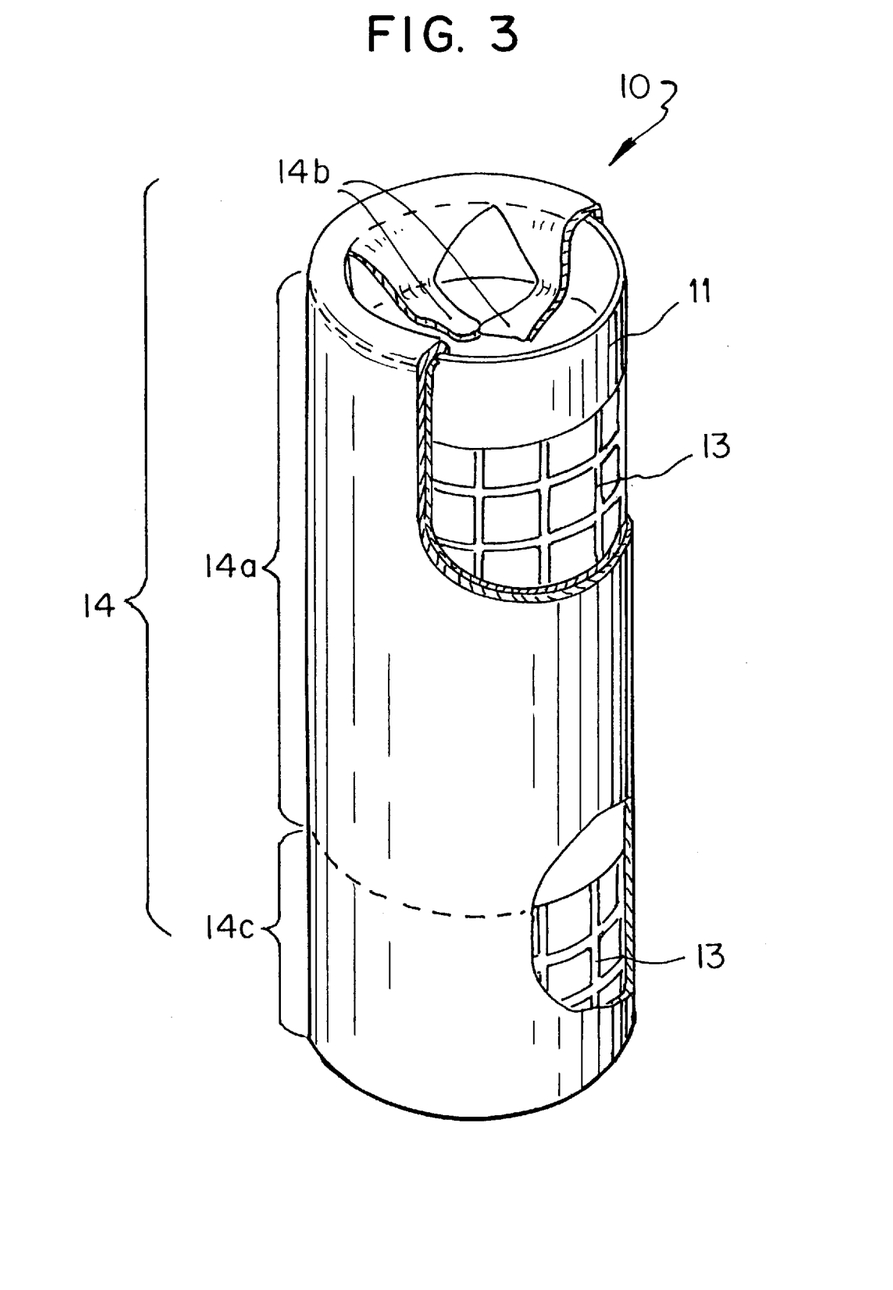
FIG. 3 is a partially cut away perspective view of a vaporization unit of an extermination device according to an embodiment of the present invention.

Referring to FIG. 3, vaporizing unit 10 according to a cylindrical embodiment of the present invention includes a cylindrical liquid storage container 11 in which extermination liquid 12 is stored. Liquid storage container 11 is supported by a support 13. Support 13, shaped cylindrically from a lattice frame, is permeable to allow air circulation. A permeable saturating body, such as a gauze 14, is mounted on an outer surface of support 13. Thus, support 13 serves as a support for liquid storage container 11 and gauze 14.

Gauze 14 includes a thick portion 14a which is preferably saturated with large amounts of extermination liquid 12 and a thin tongue portion 14b on an upper end of thick portion 14a. Tongue portion 14b is transferably connected to liquid storage container 11 by immersion in extermination liquid 12 contained in liquid storage container 11. Thus, tongue portion 14b transfers extermination liquid 12 from liquid storage container 11 to thick portion 14a of gauze 14. A lower end of tongue portion 14b forms thick portion 14a and a lower end of thick portion 14a forms a thin portion 14c.

Vaporization unit 10 includes liquid storage container 11, support 13, and gauze 14. Vaporization unit 10 detachable and removable from middle case section 5 and case 1, thus allowing easy accessibility, removal, and replacement from within case 1. By having vaporization unit 10 replaceable in this manner, handling and maintenance is easy and efficient.

Figure 4:
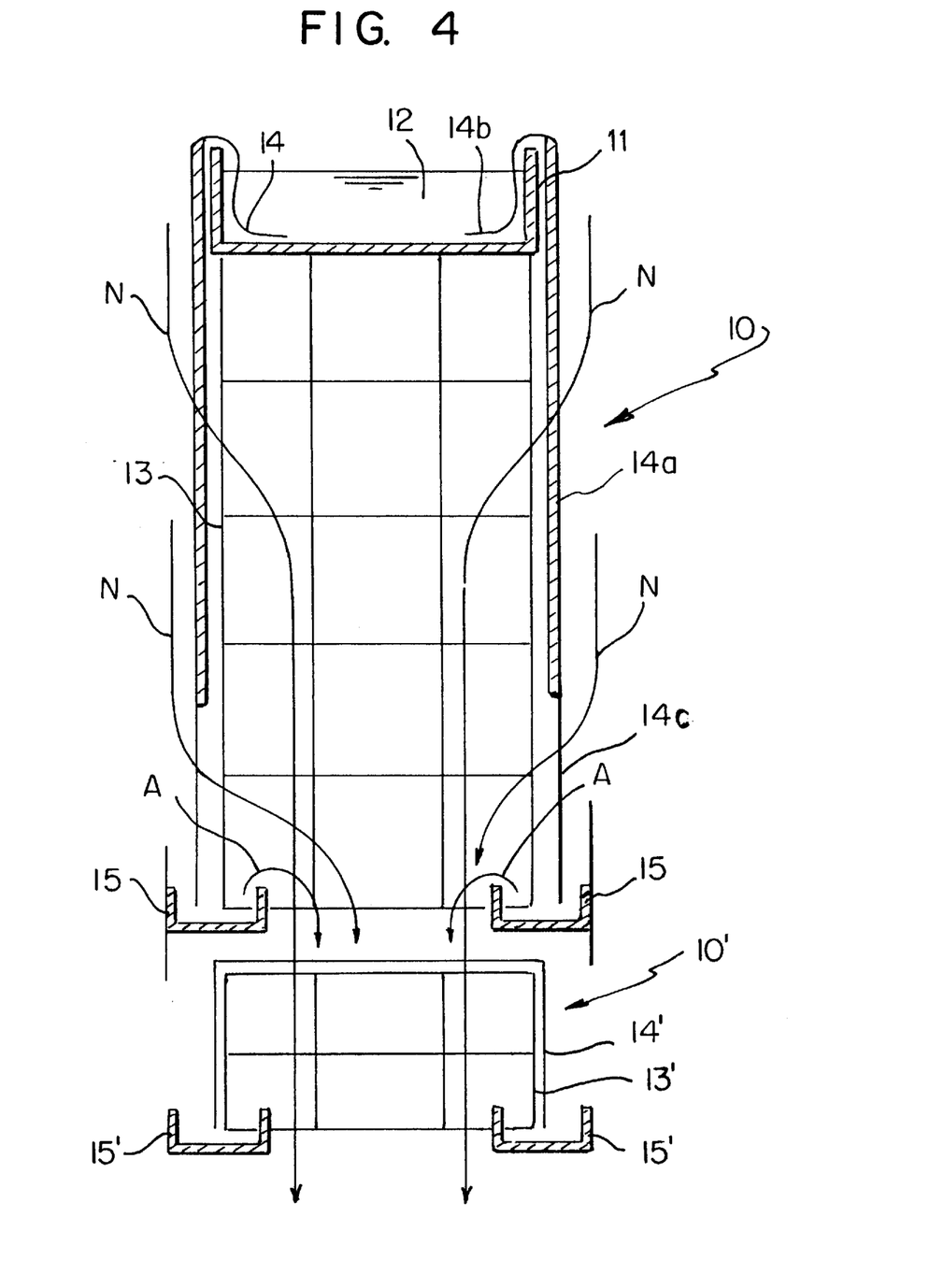
FIG. 4 is a cross-section of the vaporization unit of an extermination device according to an embodiment of the present invention.

Referring to FIG. 4, vaporizing unit 10 is mounted above second vaporizing unit 10' allowing excess extermination liquid from vaporizing unit 10 to wet second vaporizing unit 10'. In operation, extermination liquid 12 contained within liquid storage container 11 is sucked up by tongue portion 14b via capillary action. Extermination liquid 12 travels to thick portion 14a and thin portion 14c. Excess extermination liquid 12 drips down from the lower end of thin portion 14c and accumulates in channelled container 15.

Thus, gauze 14 is continuously saturated with extermination liquid 12. Overflow from channelled container 15 drips onto vaporizing unit 10', thereby wetting gauze 14'.

Air driven by sirocco fan 16 passes an air current N through and around gauze 14 and 14', particularly through and around thin section 14c which has high surface area and permeability. Air current N vaporizes extermination liquid 12 and carries extermination liquid 12 vapor out from extermination device 20 through either ventilation opening 8 or opening 9 depending on the rotational direction of sirocco fan 16.

When there is no remaining extermination liquid 12 inside liquid storage container 11, liquid storage container 11 is refilled with extermination liquid 12 via intake hole 3.

Second vaporizing unit 10' is within middle case section 5. Second vaporizing unit 10' has approximately the same configuration as vaporization unit 10 described above. Support 13' is a cylinder which includes a lattice frame. Gauze 14' is mounted and supported on outer side and top surfaces of support 13'. Support 13' and the lower end of gauze 14' are mounted on channelled container 15'.

Extermination fluid 12 that overflows from channelled container 15 in vaporizing unit 10 flows down to the top surface of gauze 14' of second vaporizing unit 10' (arrow A in FIG. 4), thereby wetting gauze 14'. After extermination liquid 12 completely saturates gauze 14', the excess extermination liquid 12 drips down into channelled container 15', where it is stored in channelled container 15'. Thus, second vaporizing unit 10' recovers extermination liquid 12 which drips off container 15.

In order to improve handling and maintenance, it is preferable to combine liquid storage container 11 and permeable saturating body 14 into a single replaceable unit.

Extermination device 20 of the present invention is preferably installed in an appropriate position in a site for extermination. Switch 6 is activated to drive motor 17. The air from outside enters case 1 via opening 9. Air passes downward through gauze 14, as indicated by arrow N as shown in FIG. 4. The air is then blown outside via ventilation opening 8.

The stream of air evaporates extermination liquid 12 from gauze 14. The vaporized extermination liquid 12 is blown out with the air, exterminating noxious vermin and plants, depending on the type of extermination liquid, within the site. Dotted arrows indicate the flow of air as shown in FIG. 1 and FIG. 2. The air sucked into case 1 via opening 9 passes through the lower portion of gauze 14 rather than the upper portion of gauze 14, as shown in FIG. 4 because the upper portion of gauze 14 forms thick portion 14a. The added mass of thick portion 14a helps prevent thick portion 14a from drying out, thereby making thick portion 14a an effective reservoir and allowing large amounts of extermination liquid 12 to transfer from liquid storage container 11 to thin portion 14c.

Extermination liquids are commonly used in situations where a low ground level application is needed, such as with produce grown on the ground or produce grown on a film laid out in greenhouses. Thus, in such cases, an embodiment of the present invention advantageously directs the gas from extermination liquid 12 downward, towards the ground, from ventilation opening 8 of base 4. This embodiment also is effective in restaurants to eliminate noxious vermin that crawl on the floor.

Furthermore, in certain applications it is desirable to keep the gas at a low temperature and a high specific gravity to allow the gas to diffuse low along the ground. Possible methods for lowering the gas temperature include cooling extermination liquid 12 in a refrigerator before storing in liquid storage container 11, and dropping ice into liquid storage container 11. Such means actively lower the temperature of the gas, consequently increasing the specific gravity of the gas. The dense gas then diffuses along the ground or floor.

However, such active means are not necessary in the extermination device of the present invention because, by the present invention's design, the air passing through gauzes 14 and 14' evaporates extermination liquid 20. As a result, the heat of vaporization taken up by the vaporizing process results in a drop in temperature. Thus, in using the present invention, it is often not necessary to cool the evaporated gas actively further than the temperature drop caused by vaporization.

In cases where produce is grown upright or in the air, such as in melons or tomatoes, where the area requiring extermination liquid 20 treatment is high off the ground, it is preferable to use an embodiment of the present invention with motor 17 turning in reverse.

Referring to FIG. 2, an embodiment where motor 17 is turning in reverse results in an air flow opposite to the dotted arrows. The air from outside is sucked in through lower ventilation opening 8. The air passes through gauzes 14, 14' from below, and is blown upward from upper opening 9. This method is effective in exterminating insects and mites that attach themselves onto melons, tomatoes, and the like.

The present invention is not restricted to the embodiments described above. For example, in the above embodiments, extermination liquid 12 in liquid storage container 11 wets gauze 14 by tongue portion by the action of 14*b* of gauze 14. Alternatively, a plurality of small holes at the bottom of liquid storage container 11 lets extermination liquid 12 drip through the holes to saturate gauze 14.

In still another embodiment of the present invention, a plurality of wicks transfer extermination liquid 12 from liquid storage container 11 to gauze 14.

The shape of the extermination device is not limited to a cylindrical shape. Substantially flat, spherical, rectilinear and complex decorative shapes are contemplated by the present invention. In an embodiment of the present invention, an extermination device, suitable for hanging on a wall, is of a substantially flat shape.

In another embodiment of the present invention, an extermination device is of a substantially flat shape, with a permeable saturating body next to a liquid storage container. A fan and hood are next to the permeable saturating body. This embodiment is suitable for areas with low height requirements such as, for example, placement under cars or pallets.

In another embodiment of the present invention, an extermination device is of a substantially spherical shape, suitable for suspending from a ceiling to disperse extermination liquid vapors decoratively from a central point in the enclosed space. In another embodiment of the present invention, an extermination device is of a substantially rectilinear shape to fit unobtrusively to conventional room decors. In still another embodiment of the present invention, an extermination device is of a complex decorative shape to suit a custom design criteria.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An extermination device comprising:

means for storing an extermination liquid in a case;

a permeable saturating body removably connected to said case;

means for wetting said permeable saturating body with said extermination liquid from said means for storing said extermination liquid, wherein said means for wetting employs a sequence of capillary action and gravity;

a permeable support, supporting said permeable saturating body, said permeable saturating body being between said case and said permeable support;

said permeable support having a lattice structure, and supporting said means for storing at a top of said case; and means for vaporizing said extermination liquid from said permeable saturating body by forcing air through said wetted permeable saturating body.

2. An extermination device according to claim 1 wherein:

said means for wetting includes a wicking portion of said permeable saturating body; and said wicking portion is in contacting relationship with said extermination liquid causing said wetting by capillary action.

3. An extermination device according to claim 1 wherein said means for vaporizing includes at least one fan.

4. An extermination device comprising:

means for storing an extermination liquid in a case;

a permeable saturating body removably connected to said case;

means for wetting said permeable saturating body with said extermination liquid from said means for storing said extermination liquid, wherein said means for wetting employs a sequence of capillary action and gravity;

a permeable support, supporting said permeable saturating body, said permeable saturating body being between said case and said permeable support;

said permeable support having a lattice structure, and supporting said means for storing at a top of said case; and means for vaporizing said extermination liquid from said permeable saturating body by forcing air around said wetted permeable saturating body.

5. An extermination device according to claim 4 wherein:

said means for wetting includes a wicking portion of said permeable saturating body; and said wicking portion is in contacting relationship with said extermination liquid, thereby causing said wetting by capillary action.

6. An extermination device according to claim 4 wherein said means for vaporizing includes at least one fan.

7. An extermination device comprising:

means for storing an extermination liquid in a case;

a permeable saturating body removably connected to said case;

a permeable support, supporting said permeable saturating body, said permeable saturating body being between said case and said permeable support;

said permeable support having a lattice structure, and supporting said means for storing at a top of said case;

means for wetting said permeable saturating body with said extermination liquid from said means for storing said extermination liquid, wherein said means for wetting employs a sequence of capillary action and gravity; and means for vaporizing said extermination liquid from said permeable saturating body by at least one fan forcing air through said wetted permeable saturating body.

8. An extermination device comprising:

a liquid storage container for storing an extermination liquid;

said liquid storage container being mounted in a case;

a permeable saturating body in said case below said liquid storage container;

a permeable support, supporting said permeable saturating body, said permeable saturating body being between said case and said permeable support;

said permeable support having a lattice structure, and supporting said means for storing at a top of said case;

said permeable saturating body being wetted with said extermination liquid from said liquid storage container by employing a sequence of capillary action and gravity;

a first plurality of openings in said case;

a second plurality of openings in said case;

means for drawing air into said case through said first plurality of openings in said case and blowing air out of said case through said second plurality of openings in said case;

said means for drawing air forcing said drawn air through said permeable saturating body, thereby vaporizing said extermination liquid wetted therein, and emitting of said vaporized extermination liquid through said second plurality of openings in said case.

9. An extermination device according to claim 8 wherein said means for vaporizing includes at least one fan.

10. An extermination device comprising:

a liquid storage container for storing an extermination liquid;

said liquid storage container being mounted in a case;

a first permeable saturating body in said case below said liquid storage container;

said first permeable saturating body being wetted with said extermination liquid from said liquid storage container by employing a sequence of capillary action and gravity;

a first plurality of openings in said case;

a second plurality of openings in said case;

means for drawing air into said case through said first plurality of openings in said case and blowing air out of said case through said second plurality of openings in said case;

said means for drawing air forcing said drawn air through said first permeable saturating body, thereby vaporizing said extermination liquid wetted therein, and emitting of said vaporized extermination liquid through said second plurality of openings in said case;

an upper housing portion of said case removably connected to a middle portion of said case;

said middle portion being removably connected to a lower base portion of said case;

a first permeable support under said liquid storage container supporting said first permeable saturating body;

said first permeable saturating body consisting of a series of continuous surfaces substantially in the shape of a hollow cylinder having a first end and a second end, said second end being folded inward;

a first vaporizing unit formed from said liquid storage container, said first permeable support, and said first permeable saturating body;

said vaporizing unit replaceably stored within said upper portion;

a second permeable saturating body;

a second permeable support supporting said second permeable saturating body under said first vaporizing unit;

a second vaporizing unit formed from said second permeable saturating body and said second permeable support; and said second vaporizing unit replaceably stored within said middle portion.

11. An extermination device comprising:

a liquid storage container for storing an extermination liquid;

said liquid storage container being mounted in a case;

an upper housing portion of said case being removably connected to a middle portion of said case;

said middle portion being removably connected to a lower base portion of said case;

a first permeable saturating body mounted below said liquid storage container;

said first permeable saturating body being wetted with said extermination liquid from said liquid storage container by capillary action;

a first permeable support being under said liquid storage container supports said first permeable saturating body;

a first vaporizing unit formed from said liquid storage container, said first permeable support, and said first permeable saturating body;

said first vaporizing unit replaceably stored within said upper portion;

a second permeable saturating body;

a second permeable support supporting said second permeable saturating body under said first vaporizing unit;

a second vaporizing unit formed from said second permeable saturating body and said second permeable support;

said second vaporizing unit replaceably stored within said middle portion;

a first plurality of openings in said case;

a second plurality of openings in said case;

at least one fan being mounted in said case;

said at least one fan draws air into said case through said first plurality of openings in said case and blow air out of said case through said second plurality of openings in said case; and said at least one fan forces said drawn air through and around said first permeable saturating body and second permeable saturating body, causing vaporization of said extermination liquid wetted therein, and causing emission of said vaporized extermination liquid through said second plurality of openings in said case.

12. A vaporizing unit for extermination devices comprising:

means for storing an extermination liquid;

a permeable saturating body;

means for transferably connecting said permeable saturating body to said means for storing;

means for wetting said permeable saturating body with said extermination liquid by employing a sequence of capillary action and gravity; and a permeable support, supporting said permeable saturating body, said permeable saturating body being between said case and said permeable support;

said permeable support having a lattice structure, and supporting said means for storing at a top of said case.

13. A vaporizing unit according to claim 12 wherein said means for wetting includes a wicking portion of said permeable saturating body; and said wicking portion is in contacting relationship with said extermination liquid, thereby causing said wetting by capillary action.

14. A vaporizing unit for extermination devices comprising:

means for storing an extermination liquid;

a permeable saturating body removably connected at a lower end of said means for storing;

a permeable support, supporting said permeable saturating body, said permeable saturating body being between said case and said permeable support;

said permeable support having a lattice structure, and supporting said means for storing at a top of said case; and means for wetting said permeable saturating body being wetted with said extermination liquid via capillary action.

* * * * *